United States Patent
Lysen

(10) Patent No.: US 9,377,347 B2
(45) Date of Patent: Jun. 28, 2016

(54) SENSOR ARRANGEMENT AND METHOD FOR PRODUCING A SENSOR ARRANGEMENT

(71) Applicant: Pruftechnik Dieter Busch AG, Ismaning (DE)

(72) Inventor: Heinrich Lysen, Garching (DE)

(73) Assignee: PRUFTECHNIK DIETER BUSCH AG, Ismaning (DE)

( * ) Notice: Subject to any disclaimer, the term of this patent is extended or adjusted under 35 U.S.C. 154(b) by 374 days.

(21) Appl. No.: 14/047,509

(22) Filed: Oct. 7, 2013

(65) Prior Publication Data
US 2014/0096611 A1     Apr. 10, 2014

(30) Foreign Application Priority Data

Oct. 9, 2012   (DE) .......................... 10 2012 109 580

(51) Int. Cl.
*G01H 1/12*  (2006.01)
*G01H 1/00*  (2006.01)

(52) U.S. Cl.
CPC . *G01H 1/12* (2013.01); *G01H 1/00* (2013.01); *Y10T 29/49826* (2015.01)

(58) Field of Classification Search
CPC ......... G01H 1/12; G01H 1/00; G10K 11/004; G01N 29/227
USPC ............. 73/654, 866.5, 432.1, 632, 661, 659, 73/660, 855, 856
See application file for complete search history.

(56) References Cited

U.S. PATENT DOCUMENTS

| 6,289,732 | B1 * | 9/2001 | Murari | G01P 15/0802 257/704 |
| 6,295,851 | B1 * | 10/2001 | Sjostrom | B21B 37/58 72/10.1 |
| 8,371,182 | B1 * | 2/2013 | Israelachvili | G01N 3/04 356/244 |
| 2007/0057665 | A1 * | 3/2007 | Borst | G01D 11/245 324/207.2 |
| 2008/0092673 | A1 * | 4/2008 | Hansel | B60S 1/0822 73/866.5 |
| 2011/0023265 | A1 | 2/2011 | Singbartl | |
| 2013/0076977 | A1 * | 3/2013 | Hirota | H04N 5/2253 348/374 |
| 2013/0213156 | A1 * | 8/2013 | Von Scholten | G01D 4/008 73/866.5 |
| 2014/0165727 | A1 * | 6/2014 | Mueller | G01D 11/245 73/514.39 |

FOREIGN PATENT DOCUMENTS

| DE | 19643413 A1 | 5/1998 | |
| DE | 29916849 U1 | 12/1999 | |
| DE | WO 2012113592 A1 * | 8/2012 | .......... G01D 11/245 |
| EP | 2068127 A1 | 6/2009 | |
| WO | 2009095110 A2 | 8/2009 | |

* cited by examiner

*Primary Examiner* — John Fitzgerald
*Assistant Examiner* — Suman K Nath
(74) *Attorney, Agent, or Firm* — Barlow, Josephs & Holmes, Ltd.

(57) ABSTRACT

A sensor arrangement (10) has a vibration sensor (11), which includes a cable (13) and is free of a metal housing, and a holding device (12), which is joined detachably to the vibration sensor (11) and is configured and arranged to protect mechanically and fix in place the vibration sensor (11).

11 Claims, 3 Drawing Sheets

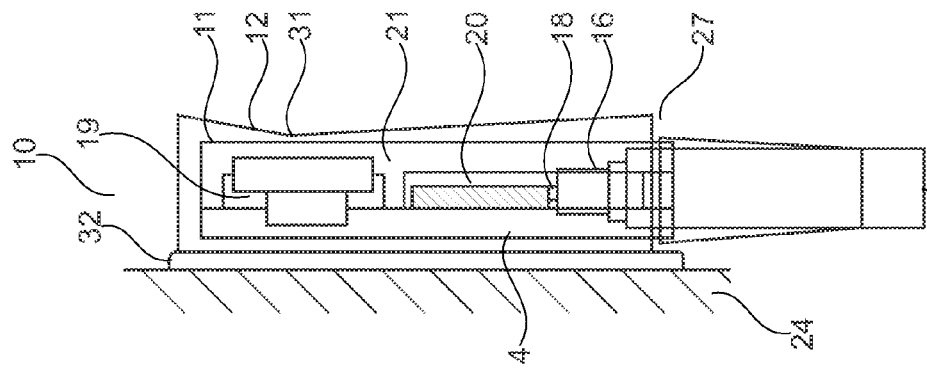
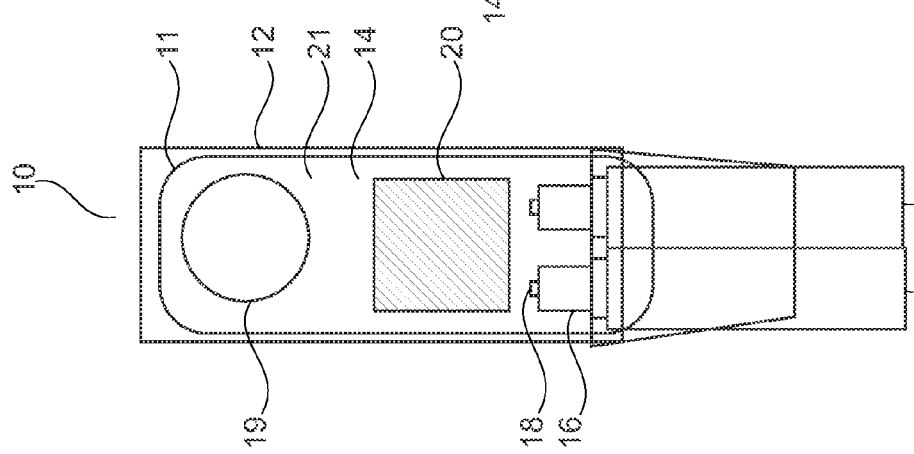
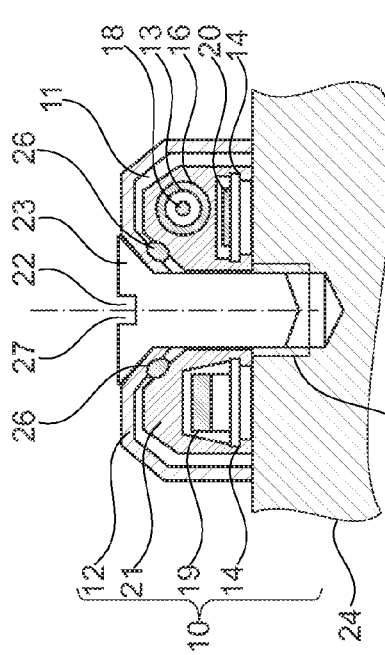
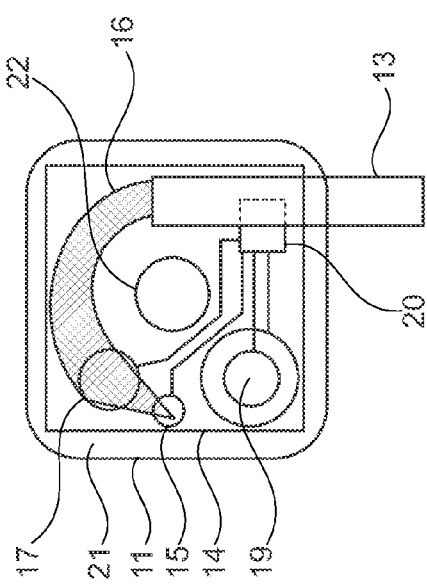

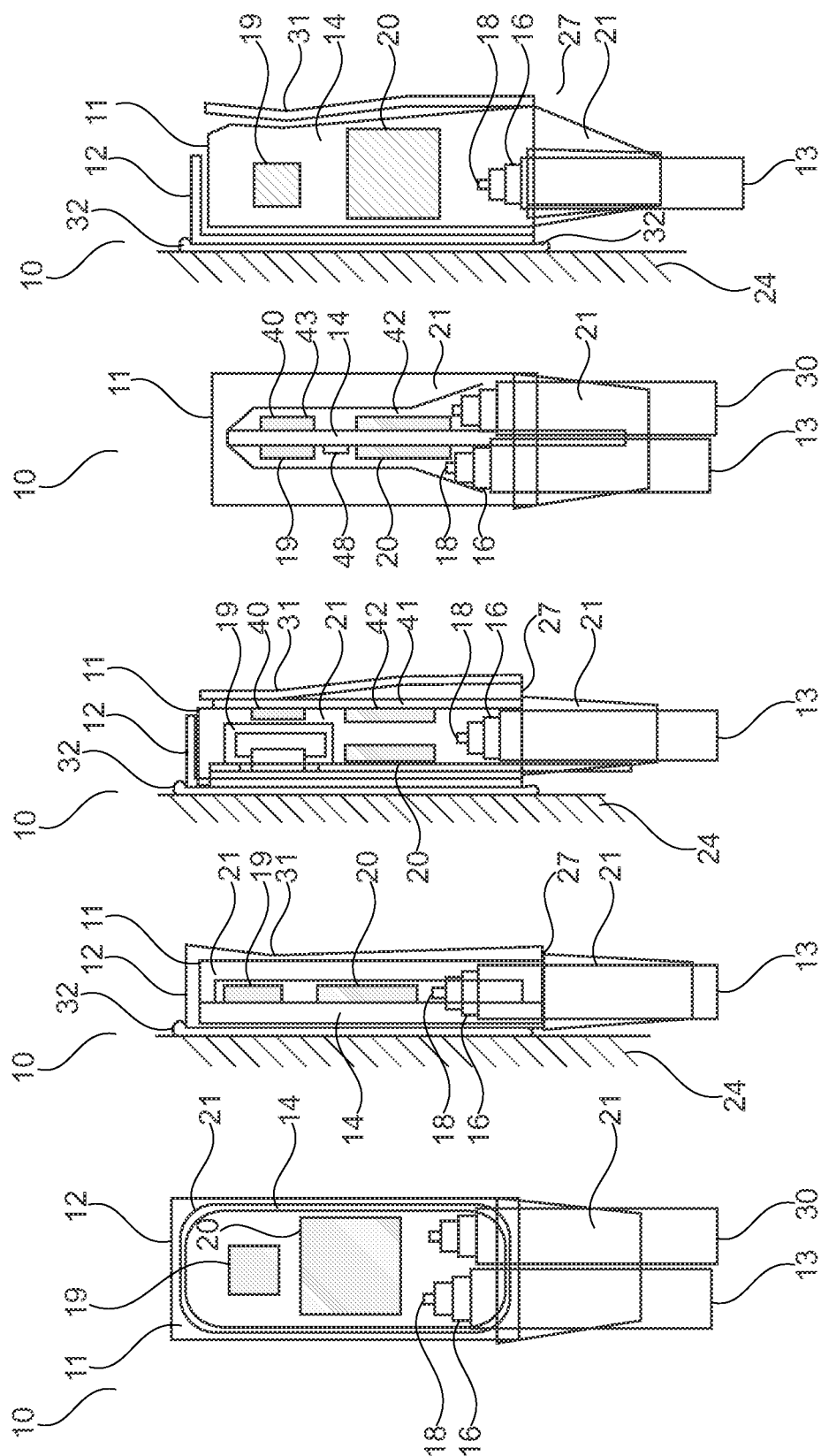

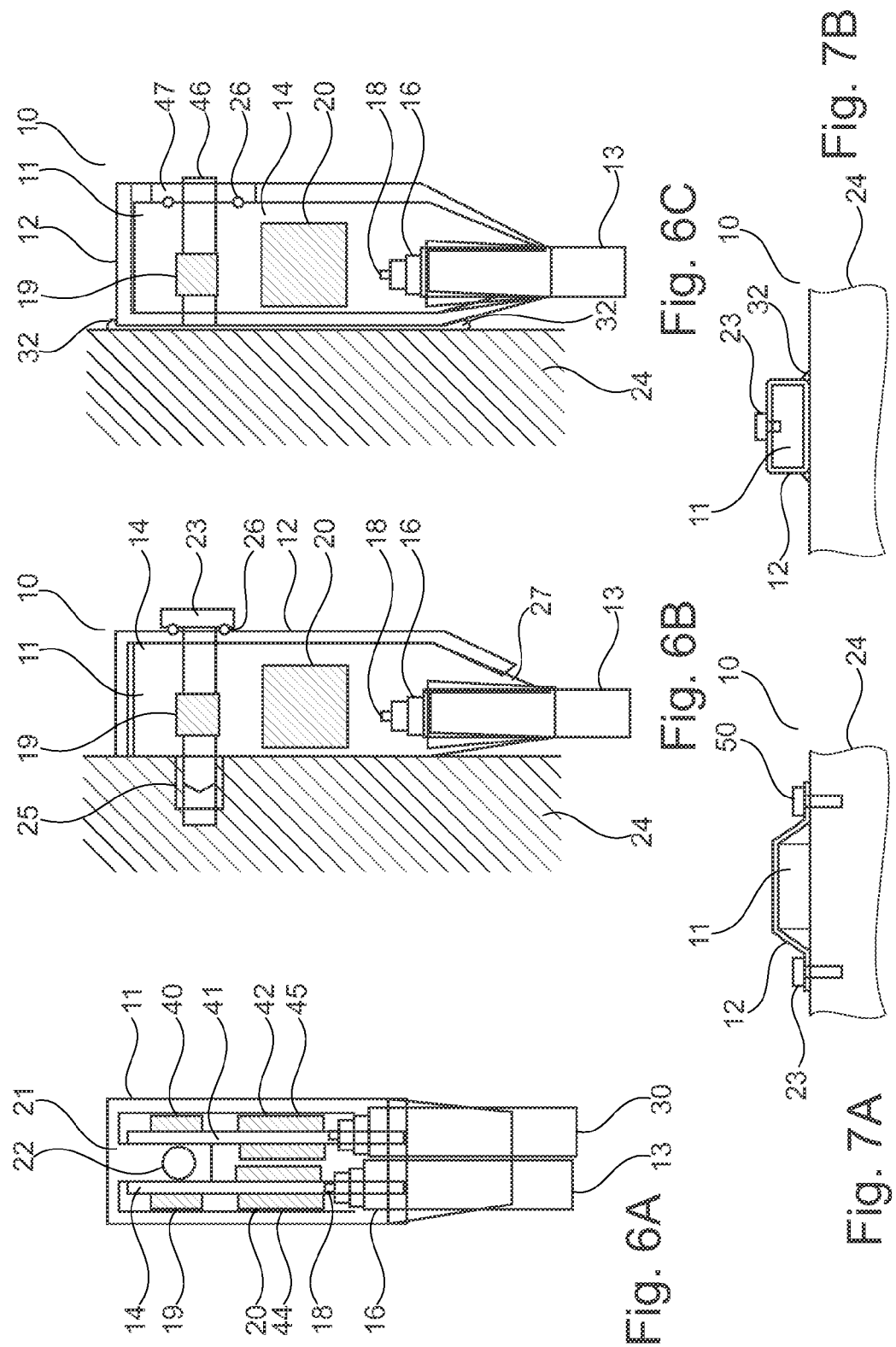

SENSOR ARRANGEMENT AND METHOD FOR PRODUCING A SENSOR ARRANGEMENT

BACKGROUND OF THE INVENTION

The invention relates to a sensor arrangement, a machine with a sensor arrangement, and a method for producing a sensor arrangement.

A sensor arrangement usually comprises a sensor, which is placed at a measuring point.

Document DE 29916849 U1 describes a fastening device for a sensor having a housing and a cable. The sensor is created as an optoelectronic sensor and is inserted into a fastening part. The fastening part is placed on a console with two fastening screws. The housing of the sensor is clamped in place by manipulating the fastening screws.

SUMMARY OF THE INVENTION

A problem of the present invention is to provide a sensor arrangement, a machine with a sensor arrangement, and a method for producing a sensor arrangement that are suitable for the measurement of vibrations.

The problem is solved by the sensor arrangement and method of the present invention. Further enhancements and embodiments are each subjects of the dependent claims.

In an embodiment, a sensor arrangement comprises a vibration sensor and a holding device. The vibration sensor comprises a cable. The vibration sensor is free of a metal housing. The holding device is joined detachably to the vibration sensor. The holding device is further constructed so as to mechanically protect and fix in place the vibration sensor.

Advantageously, the holding device fixes the vibration sensor in place for sensor mounting. As a result of the fixing in place, the vibrations to which the holding device is subjected are transmitted to the vibration sensor and can thereby be detected. The vibration sensor thus detects vibrations at the site of the holding device. Advantageously, the holding device mechanically protects the vibration sensor. As a result, even harsh surrounding conditions, which may prevail in operation or during servicing of a machine, do not lead to malfunction of the vibration sensor.

In an embodiment, a machine comprises the sensor arrangement. The holding device is fixed in place on the machine by a fastening means. The fastening means can be a screw, for example, with which the holding device is screwed onto the machine. Alternatively, the fastening means can be an adhesive or a solder, which is located between the holding device and the machine. Alternatively, the fastening means can be a bolt. In this case, the bolt can protrude from the machine. The holding device can be fitted onto the bolt and fixed in place with a nut.

In an embodiment, a method for producing a sensor arrangement comprises the fastening of a holding device on a machine, the vibrations of which are to be monitored. Further, a vibration sensor is inserted into the holding device. The vibration sensor comprises a cable and is free of a metal housing. In this case, the holding device is joined detachably to the vibration sensor. The holding device is constructed so as to mechanically protect the vibration sensor and to fix it in place on the machine.

Advantageously, vibrations of the machine can be monitored with the vibration sensor. It is advantageous for the holding device to effect mechanical protection of the vibration sensor, so that vibrations can be measured also in a harsh environment. It is advantageous for the vibration sensor to be small, of lightweight, and well protected and easy to install as well as to replace.

In an embodiment, the vibration sensor is inserted into the holding device in such a way that the vibration sensor is screwed into, screwed onto, clicked in place in, locked in place in, laid in, or pressed into the holding device.

In an embodiment, the holding device is first fastened to the machine and subsequently the vibration sensor is inserted into the holding device. In an alternative embodiment, the vibration sensor is first inserted into the holding device and subsequently the holding device is fastened on the machine.

In an embodiment, the vibration sensor can be detached again from the holding device without destroying the vibration sensor and without destroying the holding device. Afterward, the machine can be overhauled, repaired, or cleaned. Subsequently, the vibration sensor is inserted once again into the holding device.

Alternatively, the vibration sensor can be operated until the occurrence of a defect or until the end of the lifetime of the vibration sensor. Subsequently, the vibration sensor is removed from the holding device and another vibration sensor is inserted into the holding device. Because the holding device is joined permanently to the machine, the replacement vibration sensor measures the vibrations of the machine at the same measuring point as the former vibration sensor. As a result, a quick and simple replacement of the vibration sensor is accomplished.

BRIEF DESCRIPTION OF THE DRAWINGS

The invention will be described in detail below for several embodiment examples on the basis of the figures. Functional or identically acting structural elements or components bear the same reference numbers. Insofar as structural elements or components correspond to one another in terms of their function, the description thereof will not be repeated in each of the following figures. Shown are:

FIGS. 1A and 1B show a first embodiment of the sensor arrangement of the present invention;

FIGS. 2A and 2B show another embodiment of the sensor arrangement of the present invention;

FIGS. 3A and 3B show yet another embodiment of the sensor arrangement of the present invention;

FIG. 4 is another embodiment of the sensor arrangement of the present invention;

FIGS. 5A and 5B show yet another embodiment of the sensor arrangement of the present invention;

FIGS. 6A to 6C show another embodiment of the sensor arrangement of the present invention; and FIGS. 7A and 7B show exemplary embodiments of a machine with a sensor arrangement.

DETAILED DESCRIPTION OF THE INVENTION

FIGS. 1A and 1B show an exemplary embodiment of a sensor arrangement. The sensor arrangement 10 comprises a vibration sensor 11 and a holding device 12. FIG. 1A shows a cross section through the vibration sensor 11 and the holding device 12, while FIG. 1B shows a plan view of the vibration sensor 11. The vibration sensor 11 has a cable 13. The cable 13 is realized as a coaxial cable. The vibration sensor 11 further has a printed circuit board 14, which is connected to the cable 13 in an electrically conducting manner. The printed circuit board 14 may be referred to as a circuit board. Here, an outer conductor 16 of the cable 13 is connected to a first terminal 15 and an inner conductor 18 of the cable 13 is connected to a second terminal 17 on conductive traces of the printed circuit board 14. The connecting cable 13 is integrated in the vibration sensor 11. The vibration sensor 11 further comprises a sensor element 19, which is arranged on the printed circuit board 14. The vibration sensor 11 is implemented as an inertial vibration sensor. Accordingly, the sensor element 19 has an inertial mass and emits a measurement signal depending on a change in position of the inertial mass in relation to the printed circuit board 14. The sensor element 19 is realized as a piezo sensor element. Additionally arranged on the printed circuit board 14 is a processing circuit 20 of the sensor arrangement 11. The processing circuit 20 is connected to the sensor element 19 and the cable 13 in an electrically conducting manner. The processing circuit 20 processes the measurement signal and emits a processed measurement signal to the cable 13. The vibration sensor 11 receives electric power via a direct-current or alternating-current voltage applied between the outer conductor 16 and the inner conductor 18.

The vibration sensor 11 comprises a plastic housing 21. The plastic housing 21 is produced by means of a casting compound. The plastic housing 21 is realized as a dust-tight, watertight, and electrically insulated plastic housing. The cable 13 passes out of the plastic housing 21. The cable 13 is permanently joined to the printed circuit board 14 and the plastic housing 21. The vibration sensor 11 has a recess 22. The recess 22 is arranged in the center of the vibration sensor 11. The vibration sensor 11 has a nearly square base. The vibration sensor 11 does not have any metallic mechanical protective function. The vibration sensor 11 is accordingly free of a metal housing. The outer shell of the vibration sensor 11 is free of any metal and consists of the plastic housing 21 and/or the printed circuit board 14. Therefore, the vibration sensor can be designed to be small and of light weight. The weight of the vibration sensor 11 influences the measurement of the vibrations at most only slightly.

The holding device 12 may be referred to as a housing. The holding device 12 is realized as a protective jacket. The holding device 12 is made of stainless steel. The holding device 12 is designed approximately as a cylinder. The holding device 12 has a recess 27. Furthermore, the sensor arrangement 10 has a screw 23, which is inserted through the recess 22 of the vibration sensor 11 and the recess 27 of the holding device 12. A machine 24 has a threaded hole 25, into which the screw 23 is screwed. The vibration sensor 11 is screwed on the machine 24 by means of the screw 23 and the holding device 12. The screw 23 is a fastening means for fixing in place the holding device 12 on the machine 24. The holding device 12 is shaped in such a manner that the vibration sensor 11 is accommodated within it. A spring 26 is arranged between the holding device 12 and the vibration sensor 11. The spring 26 is realized as a rubber pressure spring. The holding device 12 transmits force onto the vibration sensor 11 by means of the spring 26. The vibration sensor 11 is joined to the machine 24 in a form-fitting and/or force-fitting manner without any coupling problems. The mass of the holding device 12, that is, the mass of the protective jacket, does not impair the detachable connection between the vibration sensor 11 and the machine 24. The holding device 12, that is, the protective jacket, is constructed so that the vibration sensor 11 withstands 7 joules of impact energy. The holding device 12 effects a stable mechanical protection of the vibration sensor 11.

The printed circuit board 14 is arranged parallel to the machine 24. A surface normal on the printed circuit board 14 is parallel to a surface normal of a surface of the machine 24. The vibration sensor 11 with the cable 13 is detached from the machine 24 when, for example, the machine 24 is overhauled.

The power conductors of the vibration sensor 11 are insulated from the machine 24. The insulation of the vibration sensor 11 from the machine 24 is realized by an outer sheath of the cable 13, the plastic housing 21, and the printed circuit board 14. The holding device 12 acts to support and protect the vibration sensor 11. The printed circuit board 14 is created as a glass-fiber-reinforced epoxy circuit board. The printed circuit board 14 acts to transmit vibrations from the machine to the sensor element 19. The printed circuit board 14 additionally acts to shield the sensor element 19 electrically and thermally from the machine 24.

The sensor vibration 11 measures the vibrations of the machine 24. The vibration sensor serves to monitor the machine 24. The vibration sensor 11 is placed at a suitable measuring site or measuring point on the machine 24 that is to be measured for vibrations. The machine 24 may be realized as a power machine and/or industrial machine. The vibration sensor 11 is designed to be dust-tight and watertight. Accordingly, the plastic housing 21 is dust-tight and watertight. The mean specific gravity of the materials used for the vibration sensor 11 is less than 3 g/cm$^3$. Not included as material here are cavities of the vibration sensor 11. In other words, the weight of the vibration sensor 11 divided by the volume of the vibration sensor 11 is less than 3 g/cm$^3$, with cavities of the vibration sensor 11 not being taken into consideration. The cavities are filled with air, gas, or vacuum. In calculating the weight and volume of the vibration sensor 11, the part of the cable 13 that is located inside of the holding device 12 is taken into consideration. The part of the cable 13 that is located outside of the holding device 12 is not taken into consideration. The materials used in the vibration sensor 11 are preferably composite materials, such as metal-coated glass fiber epoxy. The materials of the vibration sensor 11 are chosen such that the mean density of all components of the vibration sensor 11, without included air and without the holding device 12, is less than 3 g/cm$^3$. The density of the materials is consequently less than 3 g/cm$^3$. As a result, any influence of the vibrational behavior of the measuring site on the machine 24 due to the inertial mass of the sensor arrangement 10 is diminished.

The sensor arrangement 10, which is used in condition monitoring, is joined to the machine 24 that is to be monitored by means of the screw connection. The holding device 12 acts to transfer vibrations from the machine 24 to the vibration sensor 11. A particularly reliable coupling of the vibration sensor 11 to the machine 24 is achieved by providing a drilled hole 25 in a housing of the machine 24 with a thread. The screw 23 securing the holding device 12 and the vibration sensor 11 is screwed into the threaded hole 25. The holding device 12 keeps away environmental influences, such as moisture, dirt, and impacts, from the vibration sensor 11. When the holding device 12 is screwed in place, the contact pressure remains constant, even when pressure is applied to the side of the holding device 12 that faces away from the machine 24. The holding device 12 serves to protect the vibration sensor 11 from dust, dirt, oil, moisture, and mechanical stress or damage.

In an alternative embodiment that is not shown, the vibration sensor 11 has a socket. The cable 13 has a plug, which can be inserted into the socket of the vibration sensor 11.

In an alternative embodiment that is not shown, a bolt is welded onto the housing of the machine 24. The bolt is realized as a stud bolt. The holding device 12 fitting it is then placed onto the bolt and secured in place with a nut. The nut is tightened with a predetermined torque that ensures an optimal coupling.

FIGS. 2A and 2B show another exemplary embodiment of the sensor arrangement 10, which is a further development of the embodiment shown in FIGS. 1A and 1B. Whereas FIG. 2A shows a plan view of the sensor arrangement 10, FIG. 2B illustrates a cross section through the sensor arrangement 10. The vibration sensor 11 is created as a rectangular block. In this case, a length of the vibration sensor 11 is at least twice as large as a width and a height of the vibration sensor 11. The vibration sensor 11 has another cable 30. The additional cable 30 is integrated in the vibration sensor 11. The additional cable 30 also comprises an inner conductor and an outer conductor. The cable 13 as well as the additional cable 30 are realized as coaxial cables. The sensor element 19 is created as a piezo sensor element. The vibration sensor 11 measures vibrations of the machine 24 in a frequency range between 10 Hz and 20 kHz. The vibration sensor 11 is thus implemented as a high-frequency sensor.

The holding device 12 is designed as a protective case. The holding device 12 also has the shape of a rectangular block. The vibration sensor 11 is inserted into the holding device 12. To this end, the rectangular-shaped holding device 12 has the recess 27 on one side, through which the vibration sensor 11 is inserted. The holding device 12 is closed on the side facing the machine 24. The holding device 12 has a spring-acting element 31. The side of the holding device 12 that has the spring-acting element 31 is opposite-facing to the side of the holding device 12 that is placed on the machine 24. Construction of the holding device 12 from stainless steel achieves a good spring action of the spring-acting element 31. The holding device 12 is adhesively attached to the machine 24. The fastening means for joining the holding device 12 to the machine 24 is realized as an adhesive 32. The adhesive 32 is thus located between the holding device 12 and the machine 24.

Once the adhesive 32 has cured, the vibration sensor 11 is inserted into the holding device 12. The sensor arrangement 11 is thus inserted detachably into the holding device 12, which is implemented as a protective case. The vibration sensor 11 is pressed into the holding device 12. In order to replace the vibration sensor 11 in the event of a defect or during cleaning of the machine 24, the vibration sensor 11 is pulled out of the holding device 12. The vibration sensor 11 can thus be removed from the holding device 12. The holding device 12 remains on the machine 24 when the vibration sensor 11 is removed. Subsequently, the same vibration sensor 11 or another vibration sensor can be inserted into the holding device 12. The holding device 12 thus has the function of a protective case placed on the machine 24. The holding device 12 thereby creates a form-fitting or force-fitting coupling of the vibration sensor 11 to the machine 24.

The holding device 12 realized as a protective case protects the vibration sensor 11 and serves for vibrational coupling to the machine 24. The holding device 12 is fabricated from steel sheet metal, for example. The holding device 12 ensures coupling of the sensor. The protective case made of steel sheet metal or nonmagnetic materials, such as certain steels, plastics, and other materials, is adhesively attached to the machine 24 that is to be monitored. If the machine 24 is made of magnetic materials, such as steel, the holding device 12 can be positioned at the measuring point of the machine 24 by means of a magnet with suitable contact pressure during curing of the adhesive. After curing is complete, the magnet can then be removed from the holding device 12 and the vibration sensor 11 inserted in place of it.

Alternatively, the holding device 12 can be held magnetically to the machine 24. The adhesive 32 can be left out in this case.

FIGS. 3A and 3B show another exemplary embodiment of the sensor arrangement 10, which is a further development of the embodiment shown in FIGS. 1A, 1B, 2A, and 2B. The sensor element 19 is implemented as an MEMS sensor element. Here, MEMS is the abbreviation for micro-electromechanical system. The MEMS sensor element may be referred to as a microsensor element. The vibration sensor 11 measures vibrations of the machine 24 in a frequency range between 0 and 2 kHz. The vibration sensor 11 is designed as a low-frequency sensor.

The sensor element 19 is mounted on the printed circuit board 14 using SMD technology. The printed circuit board 14 serves to transmit vibrations from the machine 24 to the sensor element 19. The printed circuit board 14 is arranged so as to fit in the measuring direction or in the measuring directions of the sensor arrangement 10. The sensor element 19 is an MEMS sensor element, which is designed for measurement in one direction in the range of 0 to 2 kHz. The sensor element 19 measures in the direction of the surface normal of the sensor element 19 and thus of the printed circuit board 14. The printed circuit board 14 is arranged parallel to the surface of the machine 24, so that vibrations in the direction of the surface normal of the surface of the machine 24 can be measured.

FIG. 4 shows another exemplary embodiment of the sensor arrangement 10, which is a further development of the embodiments shown in the figures above. The vibration sensor 11 is realized as a combi-sensor. The vibration sensor 11 comprises an additional sensor element 40. Whereas the sensor element 19 is realized as a piezo sensor element, the additional sensor element 40 is designed as an MEMS sensor element. The sensor element 19 and the additional sensor element 40 detect mechanical vibrations in different frequency ranges. The vibration sensor 11 additionally comprises an additional printed circuit board 41. The additional sensor element 40 is placed on the additional printed circuit board 41. Moreover, the vibration sensor 11 comprises a further processing circuit 42, which is placed on the additional printed circuit board 41. The additional processing circuit 42 is connected to the processing circuit 20 as well as to the cable 13 in an electrically conducting manner. The vibration sensor 11 is thus realized as a combi-sensor. The combi-sensor is designed so as to determine vibrations of the machine 24 in a frequency range from 0 to 20 kHz.

The vibration sensor 11 is inserted into the holding device 12 with the spring-acting element 31. The spring-acting element 31 is implemented as a tongue. The spring-acting element 31 abuts the vibration sensor 11. The abutting area of the spring element 31 lies opposite the side of the holding device 12 through which the vibration sensor 11 is inserted. The spring-acting element 31 moves freely on the side that lies opposite the side through which the vibration sensor 11 is inserted and is fixed in place on the side through which the vibration sensor 11 is inserted. The holding device 12 is fixed in place on the machine 24 by means of the adhesive 32. The holding device 12 may be referred to as a sheet metal case or protective case.

FIGS. 5A and 5B show another exemplary embodiment of the sensor arrangement 10, which is a further development of the embodiments shown above. FIG. 5A shows the vibration sensor 11, whereas FIG. 5B shows the vibration sensor 11 in the holding device 12 in cross section. In contrast to the embodiments shown above, the printed circuit board 14 in FIGS. 5A and 5B is arranged perpendicular to the machine 24. A surface normal on the printed circuit board 14 thus forms an angle of 90° to the surface normal on the surface of the machine 24. The vibration sensor 11 is implemented as a combi-sensor and determines vibrations in the frequency range between 0 and 20 kHz. The vibration sensor 11 comprises the sensor element 19 as well as the additional sensor element 40. The sensor element 19 is designed as a high-frequency sensor element and measures vibrations in one direction in a frequency range from 10 Hz to 20 kHz. The direction may also be referred to as an axis. The additional sensor element 40 is designed as a low-frequency sensor element and measures vibrations in three directions in a frequency range from 0 Hz to 2 kHz.

The sensor element 19 and the additional sensor element 40 are arranged on opposite-lying sides of the printed circuit board 14. The vibration sensor 11 additionally comprises the processing circuit 20 as well as the additional processing circuit 42, which are arranged on the opposite-lying sides of the printed circuit board 14. The printed circuit board 14 is thus populated on both sides. The printed circuit board 14 is located between the cable 13 and the additional cable 30. Arranged between the plastic housing 21 and the sensor element 19 is an electrical shielding 43. The vibration sensor 11 additionally has a temperature sensor element 48. The temperature sensor element 48 is arranged on the printed circuit board 14.

The holding device 12 is implemented as a protective case. The protection by the holding device 12 is designed to withstand 7 joules at an impact radius of 12 mm. The sensor element 19 measures vibrations in two directions. For example, a sensor element 19, realized as an MEMS sensor element, measures vibrations in two directions. In this case, the measurement directions run in two different directions in the plane of the printed circuit board 14 perpendicular to the surface normal of the printed circuit board 14. In order to measure vibrations in the direction of the surface normals of the surface of the machine 24, the printed circuit board 14 is arranged with the sensor element 19 such that a measurement direction of the sensor element 19 runs perpendicular to an edge of the printed circuit board 14 and that the mentioned edge of the printed circuit board 14 faces the surface of the machine 24.

In an alternative embodiment, the sensor element 19, produced as a piezo sensor element, measures in two directions.

FIGS. 6A to 6C show further exemplary embodiments of the sensor arrangement 10, which are further developments of the embodiments shown above. Whereas FIG. 6A shows a vibration sensor 11 in plan view, FIGS. 6B and 6C show various holding devices 12 in cross section with the vibration sensor 11 shown in FIG. 6A. The vibration sensor 11 is likewise implemented as a combi-sensor. The vibration sensor 11 comprises the sensor element 19, which is arranged on the printed circuit board 14, and the additional sensor element 40, which is arranged on the additional printed circuit board 41. The sensor element 19 and the additional sensor element are designed like those in FIGS. 5A and 5B. The processing circuit 20 is additionally located on the printed circuit board 14, whereas the additional processing circuit 42 is arranged on the additional printed circuit board 41. An evaluation electronics 44 is additionally arranged on the printed circuit board 14 and an additional evaluation electronics 45 is arranged on the additional printed circuit board 41. The sensor element 19, realized as a piezo sensor element, measures in one direction. The measurement direction of the piezo sensor element is radial for bearings and tangential for planetary gears. The additional sensor element 40, realized as an MEMS sensor element, measures in three directions. The vibration sensor 11 further has the recess 22.

According to FIG. 6B, the holding device 12 is implemented as a protective cap. The holding device 12 is screwed into the threaded hole 25 of the machine 24 by means of the screw 23. The screw 23 is realized as a central screw. The screw 23 exhibits a spring-acting effect. Located between the holding device 12 and the vibration sensor 11 is additionally the spring 26. In this case, the spring 26 is implemented as an O-ring. In a comparable manner to FIGS. 1A and 1B, the holding device 12 can be removed from the machine 24 after loosening the screw 23 and the vibration sensor 11 can thereby be detached from the machine 24. The holding device 12 has an angular shape. The holding device 12 is open on the side facing the machine 24. As a result, two sides of the holding device 12 are open, namely the side facing the machine 24 and the side with the recess 27 for inserting the vibration sensor 11. The holding device 12 is not arranged between the vibration sensor 11 and the machine 24. The holding device 12 covers exclusively sides of the vibration sensor 11 that do not face the machine 24.

According to FIG. 6C, the holding device 12 is implemented as a protective cage. The holding device has a bolt 46, which is joined permanently to the other parts of the holding device 12. The vibration sensor 11 is placed on the bolt 46 and fixed in place by means of a nut 47. Arranged between the nut 47 and the vibration sensor 11 is the spring 26. In this case, the spring 26 is realized as an O-ring. The holding device 12 is fastened on the machine 24 by means of the adhesive 32.

FIGS. 7A and 7B show exemplary embodiments of the machine 24 with the sensor arrangement 10, which are further developments of the embodiments shown above. According to FIG. 7A, the holding device 12 is fastened on the machine 24 via the screw 23 as well as another screw 50. The holding device 12 can be realized as a protective bracket.

In FIG. 7B by contrast, the holding device 12 is joined to the machine 24 via the adhesive 32. According to the FIGS. 2A, 2B, 3A, 3B, 4, 5A, 5B, 6C, and 7B, the holding device 12 is adhesively attached to the machine 24. In this case, the holding device 12 is fastened to the machine 24 by means of the adhesive 32 without the sensor arrangement 11. When the adhesive 32 cures, the vibration sensor 11 is not yet in the holding device 12. A magnet is placed in the holding device 12 and secures in place the holding device 12 during curing of the adhesive 32 on the machine 24. Once the adhesive 32 has cured, the magnet is removed and the vibration sensor 11 is inserted into the holding device 12. Alternatively, the holding device 12 can be held with a tool such as a screw clamp or a tension belt during curing of the adhesive 32. Subsequently, the vibration sensor 11 is screwed onto the holding device by means of the screw 23. In place of the adhesive 32, a solder can also be used.

It would be appreciated by those skilled in the art that various changes and modifications can be made to the illustrated embodiments without departing from the spirit of the present invention. All such modifications and changes are intended to be covered by the appended claims.

What is claimed is:

1. A sensor arrangement, comprising:
    a vibration sensor, which includes a cable and is free of a metal housing; and
    a holding device, which is joined detachably to the vibration sensor and is configured and arranged to protect mechanically and to fix in place the vibration sensor; wherein the vibration sensor includes a dust-tight, watertight, and electrically insulating plastic housing, from which passes the cable;
    the holding device being fixed in place on a machine by a fastening means;
    wherein the holding device defines a recess on one side for passing the vibration sensor through the recess when detaching the vibration sensor from the holding device and for passing the vibration sensor through the recess when inserting the vibration sensor into the holding device.

2. The sensor arrangement according to claim 1, wherein the vibration sensor is an inertial vibration sensor.

3. The sensor arrangement according to claim 1, wherein the vibration sensor has a density of less than 3 g/cm3, with cavities in the vibration sensor not being taken into consideration.

4. The sensor arrangement according to claim 1, wherein the vibration sensor and the holding device are joined together in a form-fitting and/or force-fitting manner.

5. The sensor arrangement according to claim 1, wherein the vibration sensor is screwed into, screwed onto, clicked in place into, locked in place in, laid in, or pressed into the holding device.

6. The sensor arrangement according to claim 1, wherein the holding device is constructed from stainless steel.

7. The sensor arrangement according to claim 1, wherein the holding device is configured and arranged as a protective case, protective cap, protective cage, protective jacket, or protective bracket.

8. The sensor arrangement according to claim 1, wherein the vibration sensor includes a sensor element and a printed circuit board, on which the sensor element is fastened and which is joined to the cable in an electrically conducting manner.

9. The sensor arrangement according to claim 8, wherein the vibration sensor further includes an additional sensor element, with the sensor element and the additional sensor element detecting mechanical vibrations in different frequency ranges.

10. A method for producing a sensor arrangement, comprising the steps of:
   fastening a holding device on a machine, the vibrations of which are to be monitored, the holding device defining a recess on one side for passing a vibration sensor through the recess when detaching the vibration sensor from the holding device and for passing the vibration sensor through the recess when inserting the vibration sensor into the holding device;
   providing the vibration sensor, the vibration sensor comprising a cable and a dust-tight, watertight, and electrically insulating plastic housing, for the vibration sensor, the plastic housing being metal free and from which passes the cable;
   inserting the vibration sensor, through the recess into the holding device, with the holding device being joined detachably to the vibration sensor and being configured and arranged to mechanically protect the vibration sensor and fix the vibration sensor in place on the machine.

11. The method according to claim 10, wherein the holding device is fastened to the machine by means of an adhesive and, during curing of the adhesive, a magnet fixes the holding device in place on the machine.

* * * * *